United States Patent [19]
Hoyt et al.

[11] Patent Number: 5,604,877
[45] Date of Patent: Feb. 18, 1997

[54] METHOD AND APPARATUS FOR RESOLVING RETURN FROM SUBROUTINE INSTRUCTIONS IN A COMPUTER PROCESSOR

[75] Inventors: Bradley D. Hoyt; Glenn J. Hinton, both of Portland; David B. Papworth; Ashwani K. Gupta, both of Beaverton; Michael A. Fetterman, Hillsboro; Subramanian Natarajan; Sunil Shenoy, both of Portland; Reynold V. D'Sa, Aloha, all of Oreg.

[73] Assignee: Intel Corporation, Santa Clara, Calif.

[21] Appl. No.: 176,065

[22] Filed: Jan. 4, 1994

[51] Int. Cl.$^6$ ...................................................... G06F 9/42
[52] U.S. Cl. ............................ 395/590; 395/800; 395/585
[58] Field of Search .................................... 395/800, 375

[56] References Cited

U.S. PATENT DOCUMENTS

| | | | |
|---|---|---|---|
| 4,394,729 | 7/1983 | Armstrong | 395/375 |
| 5,179,673 | 1/1993 | Steely, Jr. et al. | 395/375 |
| 5,276,882 | 1/1994 | Emma et al. | 395/700 |
| 5,313,634 | 5/1994 | Eickmeyer | 395/700 |
| 5,355,459 | 10/1994 | Matsuo et al. | 395/375 |

OTHER PUBLICATIONS

Proceedings from The 19th Annual International Symposium on Computer Architecture, published 1992 by Association for Computing Machinery, New York, pp. 124–134, Entitled: Alternative Implementations of Two–Level Adaptive Branch Prediction, Authors: Tse–Yu Yeh and Yale N. Patt.

Publication: Computer, published Jan. 1984, pp. 6–22, Entitled: Branch Prediction Strategies and Branch Target Buffer Design, Authors: Johnny K. F. Lee, Hewlett–Packard and Alan Jay Smith, University of California, Berkeley.

Published by the Association for Computing Machinery, 1992, pp. 76–84, Entitled: Improving the Accuracy of Dynamic Branch Prediction Using Branch Correlation, Authors: Shien–Tai Pan and Kimming So, IBM Corp., and Joseph T. Rahmeh, University of Texas, Austin.

Published by the Association for Computing Machinery, 1991, pp. 51–61, Entitled: Two–Level Adaptive Training Branch Prediction, Authors: Tse–Yu Yeh and Yale N. Patt, University of Michigan.

(List continued on next page.)

*Primary Examiner*—Larry D. Donaghue
*Attorney, Agent, or Firm*—Blakely, Sokoloff, Taylor & Zafman

[57] ABSTRACT

A method and apparatus for resolving Return From Subroutine instructions in a computer processor are disclosed. The method and apparatus resolve Return From Subroutine instructions in four stages. A first stage predicts Call Subroutine instructions and Return From Subroutine instructions within the instruction stream. The first stage stores a return address in a return register when a Call Subroutine instruction is predicted. The first stage predicts a return to the return address in the return register when a Return From Subroutine instruction is predicted. A second stage decodes each Call Subroutine and Return From Subroutine instruction in order to maintain a Return Stack Buffer that stores a stack of return addresses. Each time the second stage decodes a Call Subroutine instruction, a return address is pushed onto the Return Stack Buffer. Correspondingly, each time the second stage decodes a Return From Subroutine instruction, a return address is popped off of the Return Stack Buffer. The second stage verifies predictions made by the first stage and predicts return addresses for Return From Subroutine instructions that were not predicted by the first stage. A third stage executes Return From Subroutine instructions such that the predictions are verified. Finally, a fourth stage retires Return From Subroutine instructions and ensures that no instructions fetch after a mispredicted return address are committed into permanent state.

28 Claims, 7 Drawing Sheets

OTHER PUBLICATIONS

IEEE Micro, Published Jun., 1991, pp. 10–13, and 63–73, Authors: Val Popescu, et al., Entitled: The Metaflow Architecture.

Yeh et al. "Branch History Table indexing to prevent pipeline bubbles in a wide–issue Superscalar Processor"; Dec. 1993 IEEE.

IBM TBS "Highly Accurate Subroutine Stack Prediction Mechanism" Mar. 1986.

IBM TBS "Subroutine Call/Return Stack" Apr. 1988.

IBM TBS "Subroutine Return Address Stack" Dec. 1981.

IBM TBS "Return Address Stack Cache" Apr. 1992.

Yeh et al. "A Comparison of Dynamic Branch Predictors That use Two Levels of Branch History" IEEE; 1992.

Yeh et al. "A Comprehensive Instruction Fetch Mechanism for a Processor Supporting Speculative Execution" IEEE; 1993.

| pDst Entry Number | V | RESULT DATA | FLAGS | FLAG MASK | LDST | FAULT |
|---|---|---|---|---|---|---|
| 0 | | | | | | |
| 1 | | | | | | |
| 2 | | | | | | |
| 3 | | | | | | |
| 4 | | | | | | |
| 5 | | | | | | |
| ... | | | | | | |
| n-1 | | | | | | |

REORDER BUFFER (ROB) 83

METHOD AND APPARATUS FOR RESOLVING RETURN FROM SUBROUTINE INSTRUCTIONS IN A COMPUTER PROCESSOR

FIELD OF THE INVENTION

This invention relates to the field of microprocessor architecture. Specifically, the invention relates to a mechanism that efficiently resolves "Return From Subroutine" instructions within a deeply pipelined superscalar microprocessor.

ART BACKGROUND

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waited until all the previous logic blocks complete operations before beginning its operation.

To improve efficiency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock tick the result of each processing stage is passed to the following processing stage. Microprocessors that use the technique of overlapping the fetch, decode, execute, and writeback stages are known as "pipelined" microprocessors. Some microprocessors further divide each processing stage into substages for additional performance improvement. Such processors are referred to as "deeply pipelined" microprocessors.

In order for a pipelined microprocessor to operate efficiently, an instruction fetch unit at the head of the pipeline must continually provide the pipeline with a stream of microprocessor instructions. However, conditional branch instructions within an instruction stream prevent the instruction fetch unit from fetching subsequent instructions until the branch condition is fully resolved. In pipelined microprocessor, the branch condition will not be fully resolved until the branch instruction reaches an instruction execution stage near the end of the microprocessor pipeline. Accordingly, the instruction fetch unit will stall because the unresolved branch condition prevents the instruction fetch unit from knowing which instructions to fetch next.

To alleviate this problem, many pipelined microprocessors use branch prediction mechanisms that predict the existence and the outcome of branch instructions within an instruction stream. The instruction fetch unit uses the branch predictions to fetch subsequent instructions. For example, Yeh & Patt introduced a highly accurate two-level adaptive branch prediction mechanism. (See Tse Yu Yeh and Yale N. Patt, *Two-Level Adaptive Branch Prediction*, The 24th ACM/IEEE International Symposium and Workshop on Microarchitecture, November 1991, pp. 51–61) The Yeh & Patt branch prediction mechanism makes branch predictions based upon two levels of collected branch history.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing if the branch instruction was predicted correctly.

However, if the branch prediction mechanism mispredicted the branch instruction, the microprocessor is executing instructions down the wrong path and therefore accomplishes nothing. When the microprocessor eventually detects the mispredicted branch, the microprocessor must flush the instructions that were speculatively fetched from the instruction pipeline and restart execution at the correct address.

Since a microprocessor accomplishes nothing when a branch instruction mispredicted, it is desirable to accurately predict branch instructions. Furthermore, it is desirable to correct mispredicted branches as soon as possible such that the microprocessor can restart execution at the correct address and resume useful processing as soon as possible. This is especially true for deeply pipelined microprocessors wherein a long instruction pipeline will be flushed each time a branch misprediction is made.

One type of branch instruction common to most computer processors is a "Return From Subroutine" branch instruction. The Return From Subroutine instruction instructs the microprocessor to pop a return address off the top of a Last-In-First-Out (LIFO) stack and begin executing instructions at that address. In most microprocessors, the LIFO stack is stored in a main memory coupled to the microprocessor. The LIFO stack is often maintained using a microprocessor register as a stack pointer. Thus, the Return From Subroutine instruction is an unconditional branch instruction that requires an access to main memory to execute. In the current generation of high-speed microprocessors, instructions that access main memory are slow relative to other instructions. It is therefore desirable to be able to predict the return address of Return From Subroutine branch instructions such that the processor does not need to stall while the main memory access occurs.

SUMMARY OF THE INVENTION

It is therefore an object of the present invention to provide a branch prediction mechanism that accurately predicts the existence of Return From Subroutine instructions within an instruction stream.

It is a further object of the present invention to predict a return address for each predicted Return From Subroutine instruction.

It is a further object of the present invention to decode the predicted Return From Subroutine instructions to verify the branch predictions made.

It is yet another object of the present invention to decode and identify Return From Subroutine instructions that were not predicted in an earlier branch prediction stage. After decoding and identifying each Return From Subroutine instruction, a return address should be predicted.

These and other objectives are accomplished by method and apparatus for resolving Return From Subroutine instruction of the present invention. The present invention resolves Return From Subroutine instructions in four stages. A first stage predicts Return From Subroutine instructions within the instruction stream and predicts a return address for each predicted Return From Subroutine instruction. A second stage decodes each Call Subroutine and Return From Subroutine instruction in order to maintain a Return Stack Buffer that stores a stack of return addresses. Each time the second stage decodes a Call Subroutine instruction, a return address is pushed onto the Return Stack Buffer. Correspondingly, each time the second stage decodes a Return From Subroutine instruction, a return address is popped off of the Return Stack Buffer. The second stage verifies predictions made by the first stage and predicts return addresses for Return From Subroutine instructions that were not predicted by the first stage. A third stage executes Return From Subroutine instructions such that the predictions are verified. Finally, a fourth stage retires Return From Subroutine instructions and ensures that no instructions fetch after a mispredicted return address are committed into permanent state.

BRIEF DESCRIPTION OF THE DRAWINGS

The objects, features and advantages of the present invention will be apparent to one skilled in the art, in view of the following detailed description and drawings in which.

DETAILED DESCRIPTION OF THE INVENTION

Methods and apparatus for resolving Return From Subroutine instructions in a computer processor are disclosed. In the following description, for purposes of explanation, specific nomenclature is set forth to provide a thorough understanding of the present invention. However, it will be apparent to one skilled in the art that these specific details are not required in order to practice the present invention. Furthermore, well known circuits and devices are shown in block diagram form in order not to obscure the present invention unnecessarily.

The present invention discloses methods and apparatus for resolving Return From Subroutine instructions in a computer processor. The teachings of the present invention are disclosed within the context of a deeply pipelined superscalar microprocessor that resolves branch instructions at four different stages. However, it will be apparent to those skilled in the art that individual features of the present invention can be implemented within different processor architectures.

Figure 1:
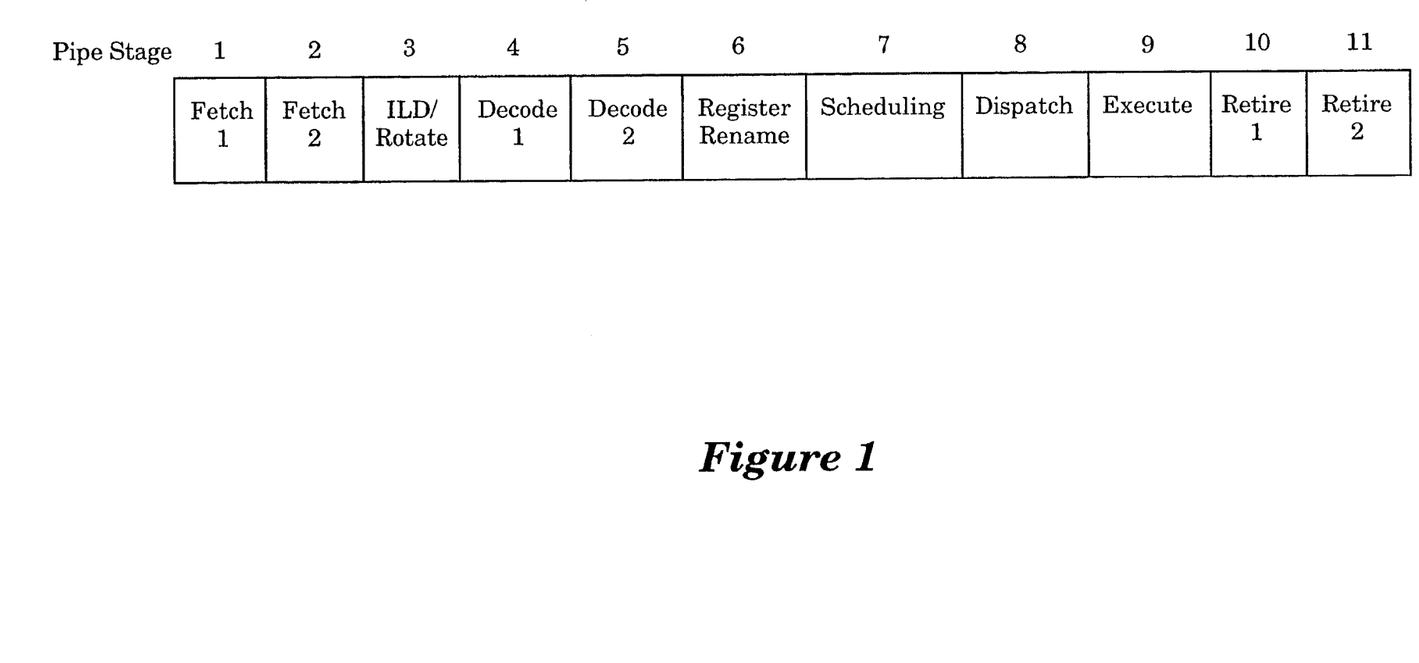
FIG. 1 is a block diagram of a deep microprocessor pipeline for processing microprocessor instructions.

In a deeply pipelined processor, the major stages of a pipelined processor such as instruction fetch, instruction decode, and instruction execute, are divided into several different substages such that each processing stage is pipelined. This results in a long instruction pipeline. For example, FIG. 1 illustrates a set of pipeline stages that defines one particular deeply pipelined processor. In the instruction pipeline of FIG. 1, the instruction processing is divided into 11 pipeline stages.

Figure 2:
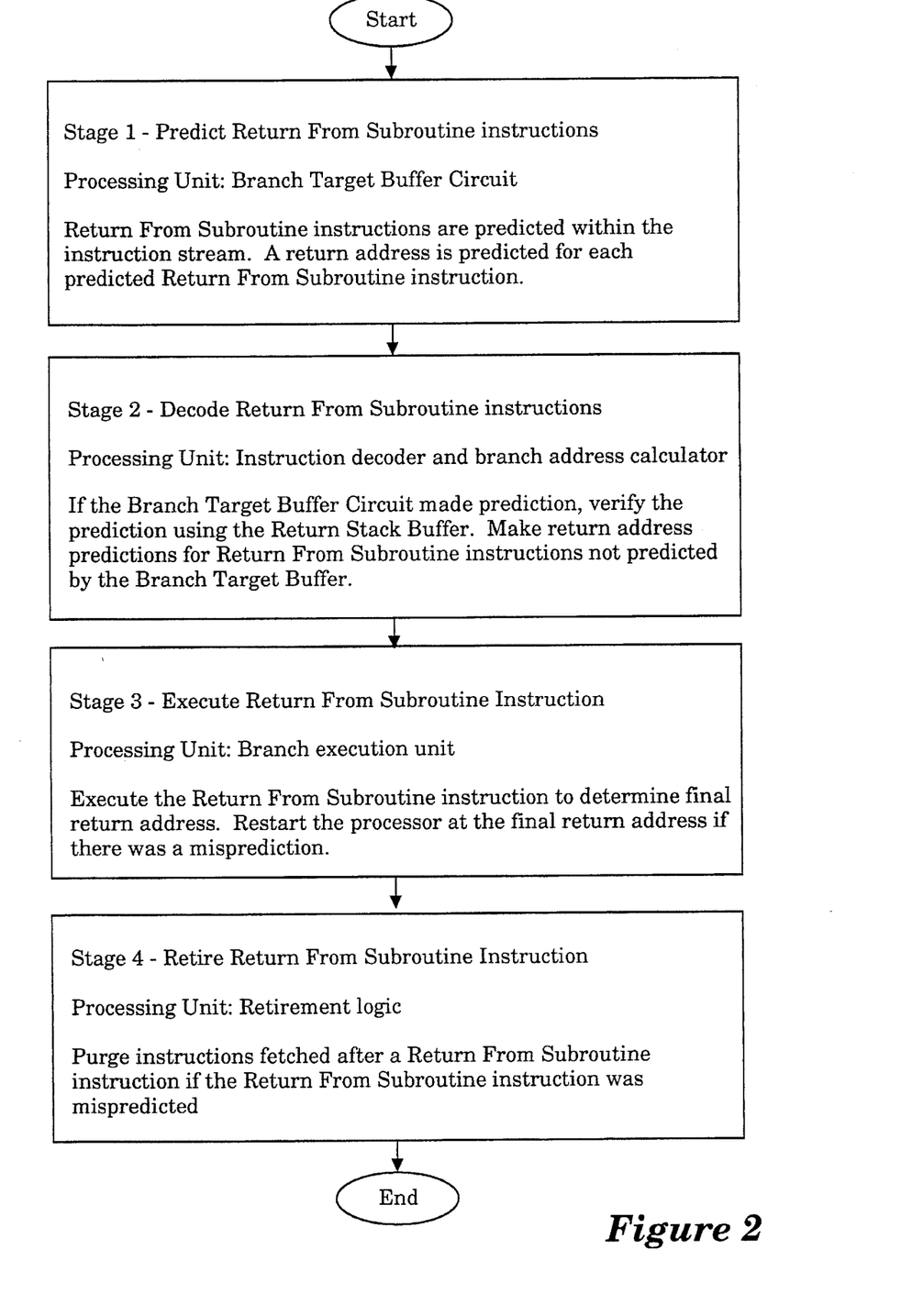
FIG. 2 is a flow diagram that explains how the present invention predicts and resolves Return From Subroutine instructions.

To resolve Return From Subroutine instructions and other branch instructions in a microprocessor containing a deep pipeline such as the pipeline illustrated in FIG. 1, the present invention utilizes four stages. The four stages are described further in the copending patent application "Method and Apparatus for Implementing A Four Stage Branch Resolution System In A Computer Processor", Ser. No. 08/176,785, filed Jan. 3, 1994. The four stage branch resolution mechanism attempts to resolve each branch instruction as soon as possible such that the microprocessor does not waste time speculatively executing instructions down a wrong path due to a branch misprediction. FIG. 2 illustrates a flow diagram that describes how the four stage branch resolution mechanism resolves Return From Subroutine instructions.

The first stage of the four stage branch resolution mechanism is a branch prediction stage. The branch prediction stage predicts the existence of Return From Subroutine instructions and other branch instructions within the instruction stream. When the branch prediction stage predicts a Return From Subroutine instruction, the branch prediction stage predicts a corresponding return address for the Return From Subroutine instruction. By predicting a return address for each Return From Subroutine instruction, the microprocessor can continue to fetch instructions without stalling until the Return From Subroutine instruction has executed.

The second stage of the branch resolution mechanism is a branch instruction decode stage. The branch instruction decode stage decodes each branch instruction verifies the branch predictions made by the preceding branch prediction stage. If the branch prediction stage predicted a Return From Subroutine instruction and a corresponding return address, the branch instruction decode stage verifies the predicted return address. The branch instruction decode stage also makes branch predictions for branch instructions not predicted by the branch prediction stage. Thus, if the branch prediction stage did not predict a particular Return From Subroutine instruction that was in the instruction stream, the branch instruction decode stage predicts a return address for that Return From Subroutine instruction.

The third stage of the branch resolution mechanism is a branch execution stage. The branch execution stage executes each branch instruction such that the final branch decision and branch target address are determined. The branch execution stage compares the final branch target address with the predicted branch target address. If the final branch target address does not match the predicted branch target address, the branch execution stage handles the branch misprediction and restarts the processor at a corrected address.

The fourth and final stage of the four stage branch resolution mechanism is a branch retirement stage. The branch retirement stage is responsible for retiring each branch instruction and ensuring that no instructions speculatively fetched after a mispredicted branch instruction are committed into permanent state.

A Microprocessor With A Four Stage Branch Resolution Mechanism

Figure 3:
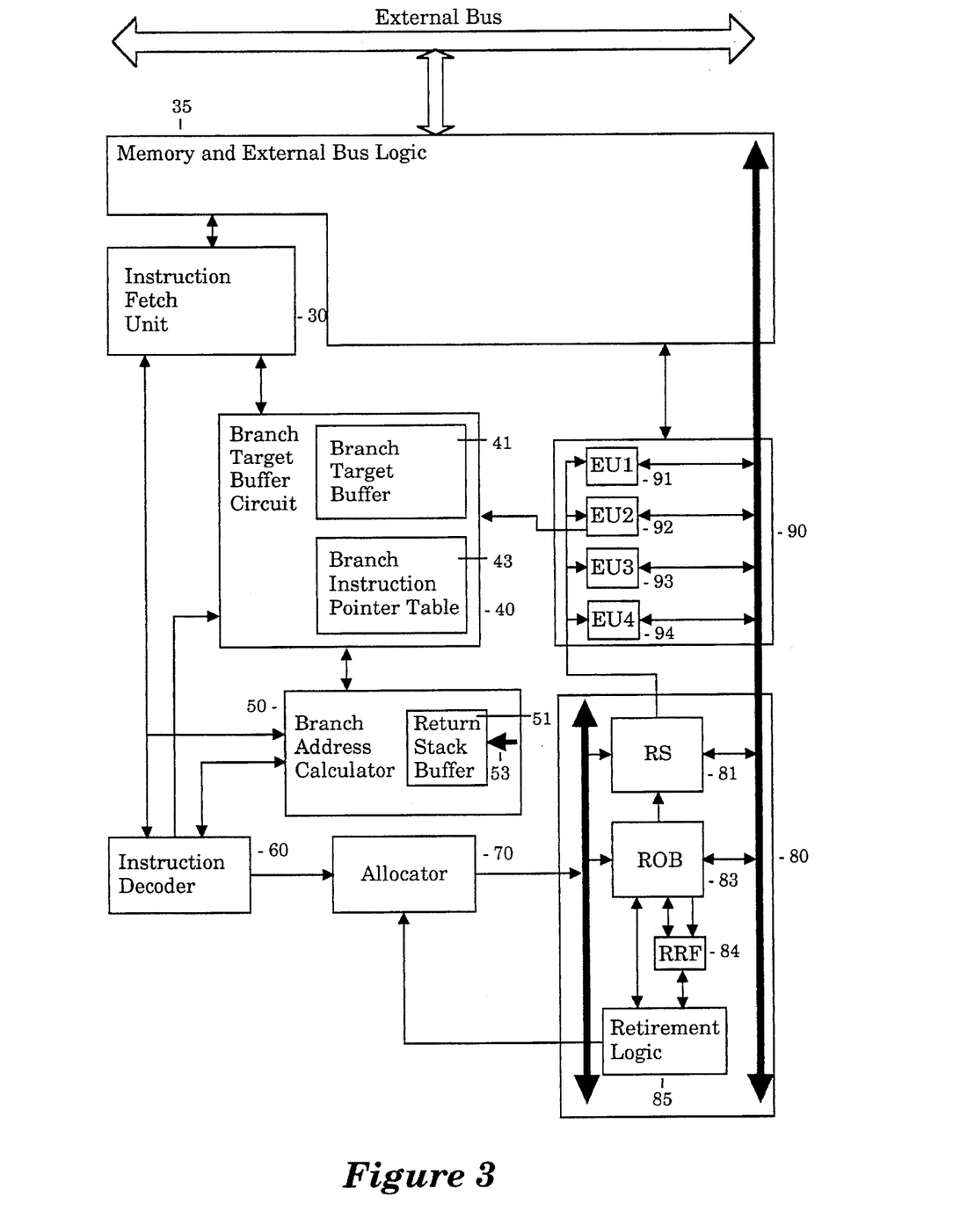
FIG. 3 is a block diagram of the different circuit blocks in a microprocessor that implements the deep pipeline illustrated in FIG. 1.

To implement the four stage branch resolution mechanism of FIG. 2, several distinct logic circuits are required. FIG. 3 illustrates, in block diagram form, the major logic circuits of a superscalar microprocessor that implements the deep pipeline illustrated in FIG. 1 and the four stage branch resolution mechanism of FIG. 2.

In the microprocessor system depicted in FIG. 3, branch instructions are handled by the following logic circuits: the Branch Target Buffer Circuit 40, the Instruction Decoder 60, the Branch Address Calculator 50, the Branch Execution Unit 92, and the Retirement Circuit 85. In order to minimize pipeline stalls, each of those logic circuits uses the information that it has available to predict and resolve branch instructions within the instruction stream. An overview of the microprocessor illustrated in FIG. 3 is provided and followed by a detailed description of how the microprocessor predicts and resolves Return From Subroutine branch instructions.

At the top of the block diagram of FIG. 3 is Memory & Bus Logic 35. The Memory & Bus Logic 35 is responsible for loading information into the microprocessor and outputting information from the microprocessor. The Memory & Bus Logic 35 usually first attempts to load or store from a high speed cache memory. If the cache memory cannot be used (perhaps due to a cache "miss"), the Memory & Bus Logic 35 instead accesses a main memory over an external bus.

Coupled to the Memory & Bus Logic 35 is an Instruction Fetch Unit 30. The Instruction Fetch Unit 30 is responsible for continually fetching new microprocessor instructions (also known as macro instructions) and operands for the microprocessor to execute. The Instruction Fetch Unit 30 uses an instruction pointer (IP) to maintain the current fetch address. The fetched microprocessor instructions are fed into the head of the instruction pipeline.

Simple unconditional branch instructions within the instruction stream prevent the Instruction Fetch Unit 30 from simply fetching instructions along a sequential path. Furthermore, conditional branch instructions within the instruction stream prevent the Instruction Fetch Unit 30 from simply fetching instructions along a predefined path since the branch condition must be resolved to determine the fetch path. To help fetch the correct instructions, the Instruction Fetch Unit 30 consults a Branch Target Buffer Circuit 40. The Branch Target Buffer Circuit 40 predicts the existence of branch instructions within the instruction stream and predicts the outcome of each predicted branch instruction. Thus, the Branch Target Buffer Circuit 40 comprises the first stage of the four stage branch resolution mechanism.

After the Instruction Fetch Unit 30 fetches each microprocessor instruction, the Instruction Fetch Unit 30 passes each microprocessor instruction to an Instruction Decoder 60. The Instruction Decoder 60 is responsible for determining what type of microprocessor instruction is received and breaking down the microprocessor instruction into one or more micro-operations (hereinafter referred to as micro-ops) with associated micro-operands. The one or more micro-ops corresponding to a microprocessor instruction perform the function of the corresponding microprocessor instruction.

If the Instruction Decoder 60 determines that a received microprocessor instruction is a branch instruction, the Instruction Decoder 60 passes information describing the branch instruction to a Branch Address Calculator 50 for special treatment. If the Branch Target Buffer Circuit 40 made a branch prediction for the branch instruction, the Branch Address Calculator 50 verifies the branch prediction using the branch information received from the Instruction Decoder 60. If the Branch Target Buffer Circuit 40 did not predict the branch instruction, the Branch Address Calculator 50 makes a branch prediction for the branch instruction using the branch information received from the Instruction Decoder 60.

The Branch Address Calculator 50 handles all decoded Call Subroutine branch instructions and Return From Subroutine branch instructions in a special manner. When the Branch Address Calculator 50 receives a Call Subroutine instruction, the Branch Address Calculator 50 pushes the address of the instruction immediately following the Call Subroutine instruction onto a stack called the Return Stack Buffer 51. The Return Stack Buffer 51 is maintained using a primary top of stack pointer referred to as the Branch Address Calculator Top-Of-Stack pointer (BAC TOS pointer) 53. Later, when the Branch Address Calculator 50 receives a Return From Subroutine instruction, the Branch Address Calculator 50 pops a return address off of the Return Stack Buffer 151 using the BAG TOS pointer 53. When the Branch Address Calculator 150 completes its operations, it returns the processed branch information to the Instruction Decoder 60. Thus the Instruction Decoder 60 and the Branch Address Calculator 150 form the second stage of the four stage branch resolution mechanism.

After the Instruction Decoder 60 breaks down a microprocessor instruction into a set of micro-ops, the Instruction Decoder 60 passes the micro-ops and associated operands to an Allocator 70. The Allocator 70 allocates the processor resources necessary to execute each micro-op. In the present embodiment, the microprocessor is a superscalar processor that may execute the micro-ops out of the original program order. However, after execution, the micro-ops must eventually be retired in the original program order to properly execute the computer program.

Figure 4:
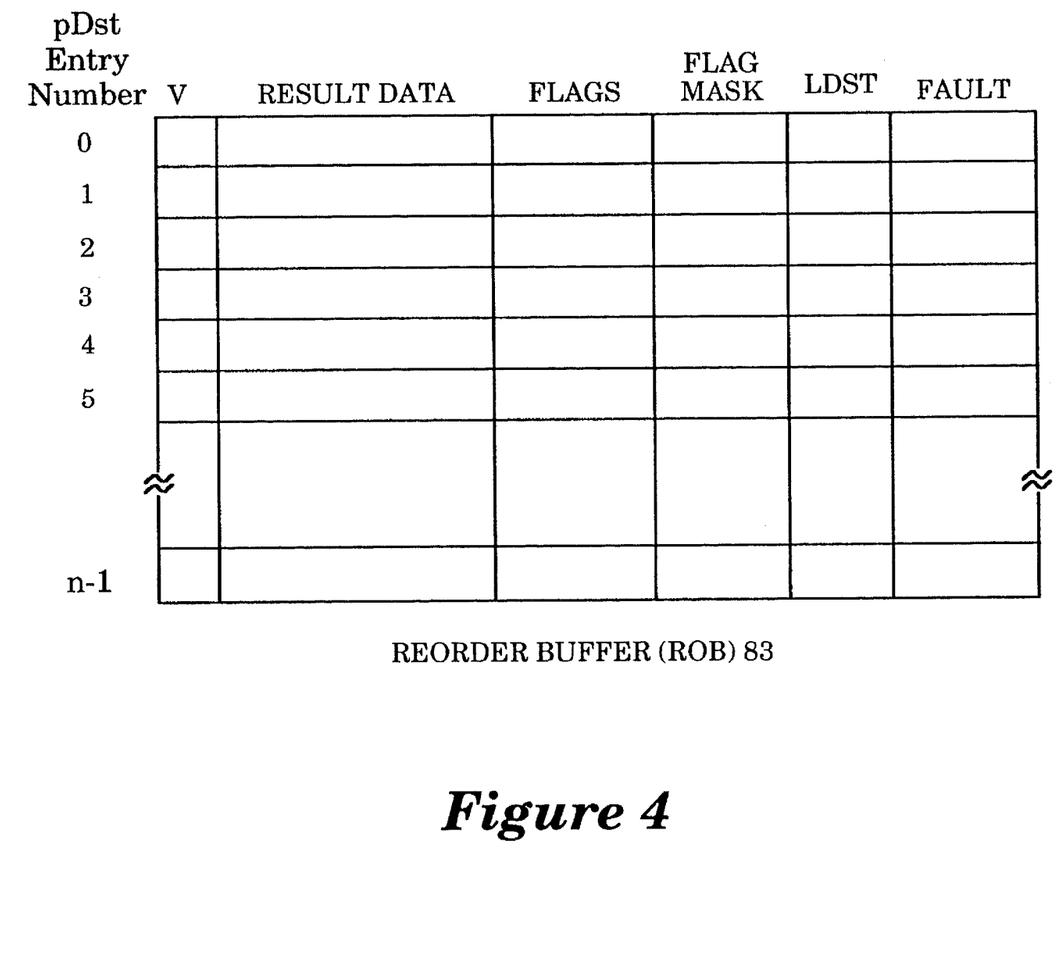
FIG. 4 is a diagram of a reorder buffer that stores the results of executed micro operations.

To maintain the original program order, the microprocessor uses a reorder buffer 83 that stores micro-op result data in the original program order. FIG. 4 illustrates the reorder buffer 83. The reorder buffer 83 of FIG. 4 comprises a circular buffer that contains n entries wherein each entry is used to store the results of executed micro-ops. Since each entry in the reorder buffer 83 provides a destination where the micro-op result data can physically be put, each reorder buffer 83 is referred to as a physical destination (pDst). The pDsts within the reorder buffer 83 are numbered 0 through n−1. Referring to FIG. 4, each pDst in the reorder buffer 83 contains fields for a valid bit that indicates whether or not the micro-op result is valid, a micro-op result, a set of flags affected by the micro-op, a mask for the flags, a code that indicates what the results mean, and fault data.

For each micro-op, the Allocator 70 allocates the next available pDst in the reorder buffer 83 to store the micro-op result. By sequentially allocating the pDsts in the reorder buffer 83 in the same order that the micro-ops are received, the original program order of the micro-op results will be maintained.

When the Allocator 70 allocates a pDst in the reorder buffer 83 for a branch micro-op associated with a branch instruction, the Instruction Decoder 60 allocates a matching entry in buffer called the Branch IP Table (BIT) 43 located in the Branch Target Buffer Circuit 40. The Instruction Decoder 60 then passes the Branch Target Buffer Circuit 40 the address of the instruction that immediately follows the branch instruction and the current BAC TOS value 53. The Branch Target Buffer Circuit 40 writes the address of the instruction that immediately follows the branch instruction and the processor state value into the Branch IP Table (BIT) 43. This information stored in the Branch IP Table (BIT) 43 is later used after the Branch Execution Unit has executed the branch micro-op.

Referring back to FIG. 3, the Allocator 70 also allocates an entry in the reservation station 81 for each micro-op. Each reservation station 81 entry stores a valid bit that indicates if the reservation station 81 entry is valid, the micro-op instruction code, two source data fields, two valid bits for the source data fields, two physical source fields that indicate where the source data will come from if the source data is not valid, and a physical destination of the result of the micro-op. After the Allocator 70 allocates a reservation station entry and a pDst in the reorder buffer 83, each micro-op waits at the reservation station 81 entry until it is executed.

Each micro-op in a reservation station 81 entry remains at the reservation station 81 entry until all the source data required to execute the micro-op has been obtained and an execution unit for executing the micro-op is ready. When all the source data required for a micro-op is ready and an execution unit is available, the reservation station 81 dispatches the micro-op to the execution unit in the execution cluster 90. In the present embodiment, there are four execution units (EU1 91, EU2 92, EU3 93, and EU4 94) in the execution logic circuit 90. After an execution unit executes a micro-op, the execution unit writes the result data, the architectural flags, and any fault information into the reorder buffer 83 pDst that the Allocator 70 allocated for the micro-op.

In the present embodiment, execution unit 92 is designated as a Branch Execution Unit. The Branch Execution Unit 92 determines a final branch outcome (taken or not-taken) and a final branch target address. The Branch Execution Unit 92 compares the final branch outcome and target address with the predicted branch outcome and target address. If the Branch Execution Unit 92 detects a mispredicted branch, the Branch Execution Unit 92 initiates a set of actions that will correct the branch misprediction. Thus the Branch Execution Unit 92 comprises the third stage of the branch resolution mechanism.

Finally, a Retirement Circuit 85 retires the results that are stored in the reorder buffer 83 pDsts from each executed micro-op. The Retirement Circuit 85 retires the Reorder Buffer 83 pDsts by sequentially going through the pDsts in the Reorder Buffer 83 in the same order that the Allocator 70 allocated the pDsts. The Retirement Circuit 85 retires pDsts by transferring the micro-op results into a Real Register File (RRF) 84 that stores the current committed architectural state. Since the Allocator 70 allocated the reorder buffer 83 pDsts in original program order and the Retirement Circuit 85 retires the micro-op results in the reorder buffer 83 pDsts in that same order, original program order is maintained even though micro-ops may have been executed out of the original program order.

Referring to FIG. 4, to retire a micro-op, the retirement circuit tests the valid bit 201 of a reorder buffer pDst entry to see if the pDst contains a valid executed micro-op result. If the valid bit 201 for the pDst is set, the retirement circuit checks the fault field 206 of the pDst to see if a fault must be handled. If the reorder buffer pDst entry contains a valid executed micro-op result and there is no fault problem, then the executed micro-op result is committed to permanent architectural state in the Real Register File (RRF) 84.

When the Retirement Circuit 85 attempts to retire a branch micro-op, the Retirement Circuit 85 tests the fault field 206 of the pDst entry to see if the branch micro-op was mispredicted. If Retirement Circuit 85 detects that the micro-op was mispredicted, the Retirement Circuit 85 flushes the remainder of the instructions in the reorder buffer 83 since those instructions were speculatively fetched after the branch misprediction. Thus the Retirement Circuit 85 comprises the final stage of the four stage branch resolution mechanism.

Resolving Return From Subroutine Instructions

The present invention discloses methods and apparatus for predicting and resolving Return From Subroutine instructions. As illustrated in FIG. 2, the present invention resolves Return From Subroutine instructions in four different stages. Each stage will be described individually.

Stage 1—Prediction of Return From Subroutine Instructions

The first logic unit in the microprocessor depicted in FIG. 3 that works to resolve Return From Subroutine instructions is the Branch Target Buffer Circuit 40. The Branch Target Buffer Circuit 40 predicts the existence of Return From Subroutine and other branch instructions within the instruction stream. Furthermore, the Branch Target Buffer Circuit 40 predicts a branch outcome and a branch target address for each predicted branch instruction.

To predict the return address for Return From Subroutine instructions, the Branch Target Buffer Circuit 40 cooperates with the Branch Address Calculator 50. The Branch Target Buffer Circuit 40 and Branch Address Calculator 50 are illustrated in greater detail in FIG. 5.

Figure 5:
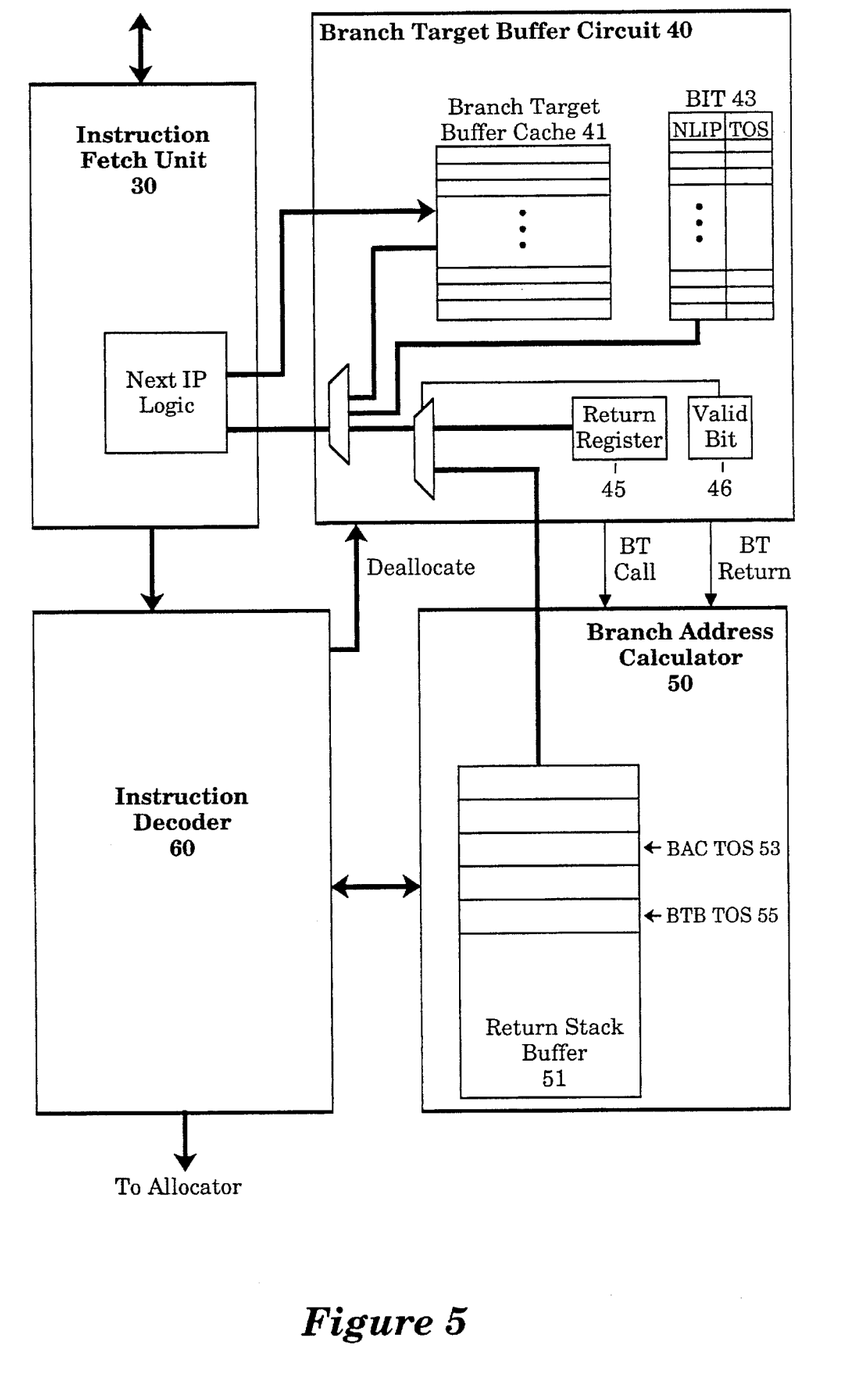
FIG. 5 is a diagram illustrating the front-end of the microprocessor of the FIG. 1 in detail.

To predict branch instructions within the instruction stream, the Branch Target Buffer Circuit 40 maintains a cache that contains information about branch instructions that the microprocessor has previously executed. The cache containing the branch information is referred to as the Branch Target Buffer Cache 41. Each time a branch instruction is resolved by the microprocessor, the Branch Target Buffer Circuit 40 records the type of branch instruction, the branch instruction's target address, and the outcome of the branch instruction into the Branch Target Buffer Cache 41 for future reference.

The branch information entries in the Branch Target Buffer Cache 41 are indexed by the branch instruction's address. Indexing each entry by address allows the Branch Target Buffer Circuit 40 to look up previously seen branch instruction using an instruction pointer (IP).

Before each instruction fetch, the Instruction Fetch Unit 30 passes a current Instruction Pointer (IP) to the Branch Target Buffer Circuit 40 to learn if there is an upcoming branch instruction that directs the microprocessor to a nonsequential address. The Branch Target Buffer Circuit 40 examines the Branch Target Buffer Cache 41 using the Instruction Pointer, looking for an upcoming branch instruction. If the Branch Target Buffer Circuit 40 finds an upcoming branch instruction, a Branch Target Buffer Cache 41 "hit" has occurred and the Branch Target Buffer Circuit 40 makes a branch prediction using the branch information from the Branch Target Buffer Cache 41. A detailed description of the Branch Target Buffer Circuit 40 can be found in the copending patent titled "Method and Apparatus for predicting Branches in a CISC processor", Ser. No. 08/177, 155, filed Jan. 4, 1994 and is hereby incorporated by reference.

When a Branch Target Buffer Cache 41 "hit" occurs, the Branch Target Buffer Circuit 40 reads out the entry that contains the branch information. One of the fields within each branch information entry is a branch type field. The Branch Target Buffer Circuit 40 handles the branch prediction differently depending upon what type of branch instruction is predicted.

The branch type field in each branch information entry specifies what type of branch instruction the branch information entry identifies. The following Table 1 lists the different types of branch instructions.

TABLE 1

| Branch Type Code | Branch Type |
| --- | --- |
| 00 | Conditional branch |
| 01 | Return From Subroutine |
| 10 | Call Subroutine |
| 11 | Unconditional branch |

As set forth in Table 1, the branch type field designates if the predicted branch instruction is a conditional, an unconditional, a Call Subroutine, or a Return From Subroutine instruction. Note that although Call Subroutine and Return From Subroutine instructions are specific types of unconditional branch instructions, those two instructions are marked as different types. The Branch Target Buffer Circuit 40 marks Call Subroutine and Return From Subroutine instructions as different types since the Branch Target Buffer Circuit 40 handles those two branch instruction types in a special manner.

The following Table 2 summarizes how the Branch Target Buffer Circuit 40 handles branch predictions for the four types of branch instructions stored within the Branch Target Buffer Cache 41.

When the Branch Target Buffer Circuit 40 predicts a Call Subroutine instruction, the Branch Target Buffer Circuit 40 predicts a branch to the target address specified by the target field of the Branch Target Buffer Cache 41 entry. Referring to FIG. 5, the Branch Target Buffer Circuit 40 also places the address of the instruction after the Call Subroutine instruction (a return address) into a Return Register 45. The Branch Target Buffer Circuit 40 sets a valid bit 46 associated with the Return Register 45 thereby indicating that the Return Register 45 contains a valid return address.

Furthermore, the Branch Target Buffer Circuit 40 signals the Branch Address Calculator 50 using the signal line BTCall to increment a stack pointer that points to a return address in the Return Stack Buffer 51. Specifically, the Branch Target Buffer Circuit 40 instructs the Branch Address Calculator 50 to increment a top of stack pointer associated with the Branch Target Buffer Circuit referred to as the BTB TOS pointer 55 (Branch Target Buffer Top-Of-Stack). The return address in the Return Register 45 or the return address pointed to by the BTB TOS pointer 55 is used when the Branch Target Buffer Circuit 40 must predict a return address for a Return From Subroutine instruction.

When the Branch Target Buffer Circuit 40 predicts a Return From Subroutine instruction, the Branch Target Buffer Circuit 40 first checks the valid bit 46 associated with the Return Register 45. The condition of the valid bit 46 associated with the Return Register 45 determines how the

TABLE 2

| | Branch Target Buffer Logic Action | |
| --- | --- | --- |
| Branch Type | Branch Prediction | Other Action |
| Unconditional Branch Instruction (Other than Call Subroutine or Return From Subroutine) | Predict branch target address from target field in Branch Target Buffer Cache | None |
| Conditional Branch Instruction | Predict branch outcome and predict next address or BTB Cache target address depending on branch outcome | Update Speculative History in BTB Cache entry |
| Call Subroutine Instruction | Predict branch target address from target field in Branch Target Buffer Cache | Put next address in Return Register, set Return Register valid bit, and increment BTB TOS pointer |
| Return From Subroutine Instruction | Predict from Return Register if Return Register valid bit set, else predict from RSB using BTB TOS pointer | Clear Return Register valid bit and decrement BTB TOS pointer |

The Branch Target Buffer Circuit 40 handles unconditional branch instructions by simply predicting a branch to the address provided within the target field of the Branch Target Buffer Cache 41 entry. The Branch Target Buffer Circuit 40 handles conditional branch instructions by first making a branch outcome decision using the branch history within the branch history field of the Branch Target Buffer Cache 41 entry. If the branch outcome decision is taken, then the Branch Target Buffer Circuit 40 predicts a branch to the address provided within the branch target address field of the Branch Target Buffer Cache 41 entry. More information on the prediction of unconditional branch instructions can be found in the copending patent titled "Method and Apparatus for predicting Branches in a CISC processor", Ser. No. 08/177,155, filed Jan. 4, 1994 and is hereby incorporated by reference.

Branch Target Buffer Circuit 40 predicts a return address for the Return From Subroutine instruction.

If the valid bit 46 is set, the Branch Target Buffer Circuit 40 uses the address stored in the Return Register 45 to predict the return address of the Return From Subroutine instruction. After predicting the return address from the Return Register 45, the Branch Target Buffer Circuit 40 clears valid bit 46 associated with the Return Register 45 since the value in the Return Register 45 is no longer current.

Alternatively, if the valid bit 46 associated with the Return Register 45 is not set, then the Branch Target Buffer Circuit 40 obtains a return address from the Return Stack Buffer 51 in the Branch Address Calculator 50. Specifically, the return address in the Return Stack Buffer 51 pointed to by the BTB TOS pointer 55 is used.

In both cases, the Branch Target Buffer Circuit 40 signals the Branch Address Calculator 50 with a BTReturn signal such that the Branch Address Calculator 50 decrements the BTB TOS pointer 55.

Figure 6:
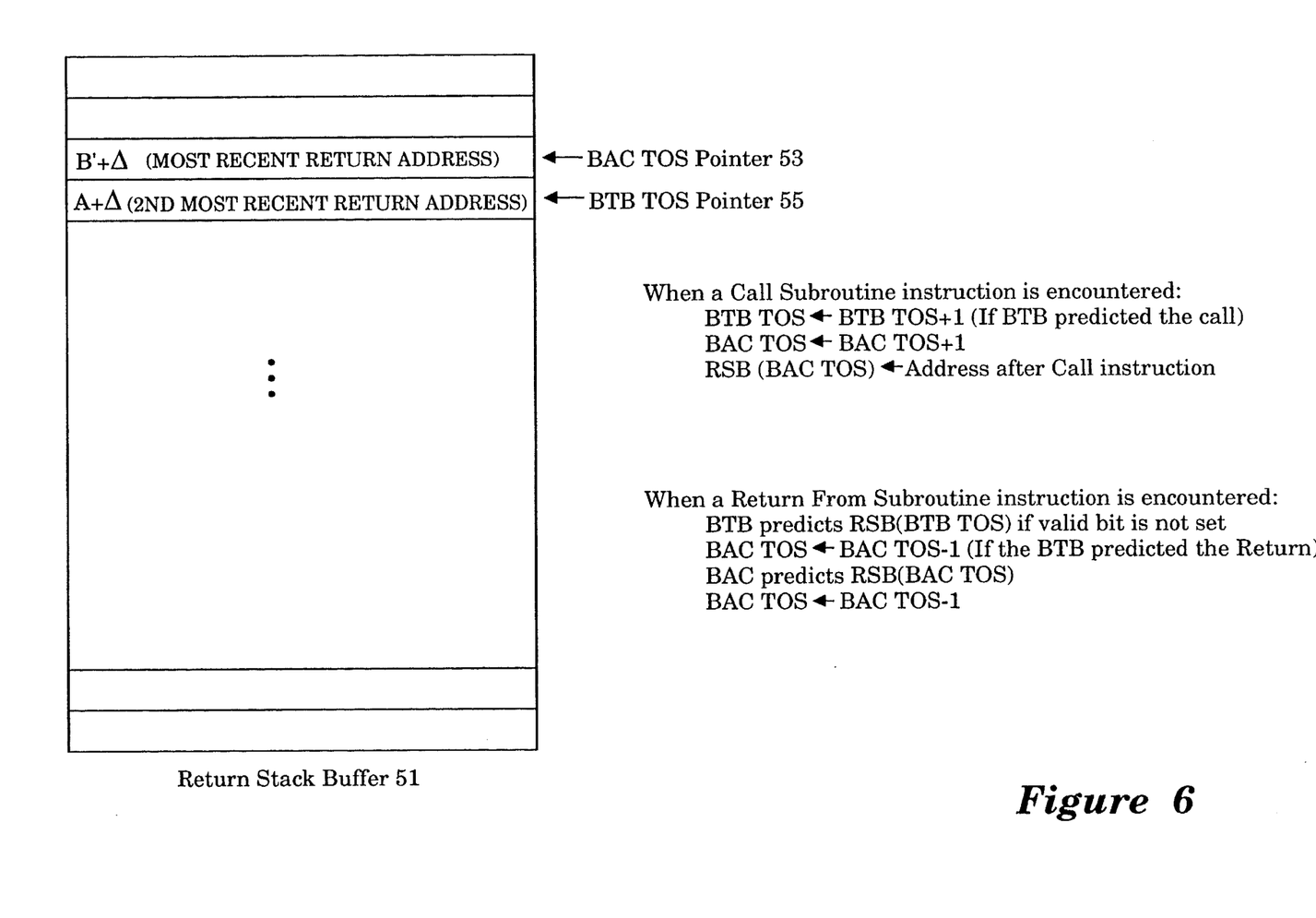
FIG. 6 is a diagram illustrating a return stack buffer used to store a series of return addresses.

As explained in the preceding microprocessor overview, the Return Stack Buffer 51 is a stack in the Branch Address Calculator 50 that stores return addresses. FIG. 6 illustrates the Return Stack Buffer 51. The Branch Address Calculator 50 maintains two different top-of-stack (TOS) pointers for the Return Stack Buffer 51: the Branch Address Calculator Top-Of-Stack pointer 53 (BAC TOS pointer) and the Branch Address Calculator Top-Of-Stack pointer 55 (BTB TOS pointer).

The BAC TOS pointer 53 is the primary stack pointer for the Return Stack Buffer 51. Each time Branch Address Calculator 50 receives a decoded Call Subroutine instruction, the Branch Address Calculator 50 increments the BAC TOS pointer 53 and pushes a return address onto the Return Stack Buffer 51 using the BAC TOS pointer 53. When the Branch Address Calculator 50 receives a decoded Return From Subroutine instruction, the Branch Address Calculator 50 pops a return address off the Return Stack Buffer 51 and decrements the BAC TOS pointer 53.

The BTB TOS pointer 55 pointer is a secondary pointer into the RSB 51. The BTB TOS pointer is used to provide return addresses to the Branch Target Buffer Circuit 40 when the Return Register 45 is invalid.

The BTB TOS pointer 55 initially points to the same Return Stack Buffer 51 entry as the BAC TOS pointer 53. The BTB TOS 55 is incremented and decremented when ever the Branch Target Buffer Circuit 40 predicts a Call Subroutine instruction or a Return From Subroutine instruction, respectively. Thus, as long as the Branch Target Buffer Circuit 40 correctly predicts every Call Subroutine instruction and Return From Subroutine instruction, the BAC TOS pointer 53 is a delayed copy of the BTB TOS pointer 55 since the Branch Address Calculator 50 receives each instruction a few clocks after the Branch Target Buffer Circuit 40 makes a prediction. Since the Branch Target Buffer Circuit 40 can only predict instructions that are stored in the Branch Target Buffer Cache 41, the Branch Target Buffer Circuit 40 will fail to predict the Call Subroutine and Return From Subroutine instructions not within the Branch Target Buffer Cache 41. Thus, the BTB TOS pointer 55 is not as accurate as the BAC TOS pointer 53.

The Return Register 45 is implemented such that the Branch Target Buffer Circuit 40 can predict return addresses for very short subroutines such as subroutines consisting of 1 or 2 instructions. The BTB TOS 55 is implemented such that the Branch Target Buffer Circuit 40 can predict return addresses when the Return Register 45 no longer contains a valid return address.

Figure 7:
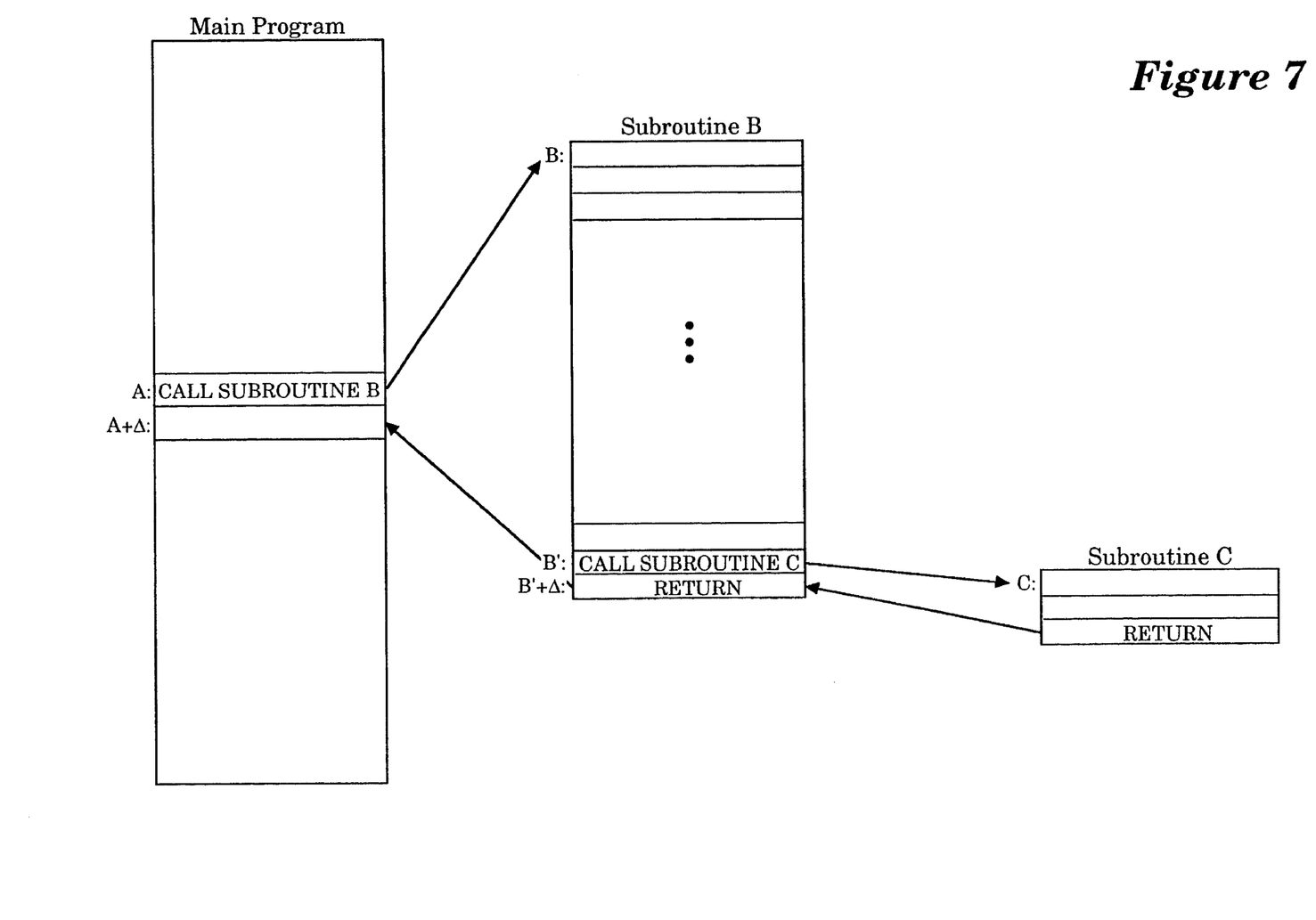
FIG. 7 is a diagram illustrating a main program that calls a first subroutine and the first subroutine calls a second subroutine.

The operation of the Return Register 45 and the BTB TOS 55 are best explained by the use of an example. FIG. 7 illustrates a main program is illustrated at the left side of the drawing.

Referring to FIG. 7, a main program is illustrated at the left side of the drawing. At memory address A, the main program calls Subroutine B. If the Branch Target Buffer Circuit 40 predicts the Call Subroutine B instruction, the Branch Target Buffer Circuit 40 places the address of the next instruction (A+Δ) into the Return Register 45, sets the valid bit 46, and sends the BTCall signal that instructs the Branch Address Calculator 50 to increment the BTB TOS 55. A few clock cycles later, the Branch Address Calculator 50 receives the Call Subroutine B instruction. The Branch Address Calculator 50 increments the BAC TOS 53 and then places the return address A+Δ onto the Return Stack Buffer 51 using the BAC TOS 53.

Within Subroutine B, at memory address B', Subroutine B calls Subroutine C. If the Branch Target Buffer Circuit 40 predicts the Call Subroutine C instruction, the Branch Target Buffer Circuit 40 places the address of the next instruction (B'+Δ) into the Return Register 45, sets the valid bit 46, and sends the BTCall signal that instructs the Branch Address Calculator 50 to increment the BTB TOS 55. At this point, the BAC TOS 53 point to the return address B'+Δ on the Return Stack Buffer 51 and the BTB TOS 55 points to the next higher Return Stack Buffer 51 entry.

Subroutine C is a very small subroutine that consists of only 3 instructions, the last instruction being a Return From Subroutine instruction. When the Instruction Fetch Unit 30 reaches the Return From Subroutine instruction at the end of Subroutine C, the previous Call Subroutine C instruction (Call Subroutine C) has not yet been processed by the Branch Address Calculator 50. If the Branch Target Buffer Circuit 40 predicts the Return From Subroutine instruction, the Branch Target Buffer Circuit 40 checks the valid bit 46. Since the valid bit is set, the Branch Target Buffer Circuit 40 predicts the correct return address using the address stored in the Return Register 45 (B'+Δ). Thus, the Return Register 45 is very useful for predicting the return address of very short Subroutines. The Branch Target Buffer Circuit 40 also sends the BTReturn signal that instructs the Branch Address Calculator 50 to decrement the BTB TOS 55.

While the Branch Target Buffer Circuit 40 is predicting the Return From Subroutine instruction, the Branch Address Calculator 50 receives the Call Subroutine C instruction. The Branch Address Calculator 50 increments the BAC TOS 53 and then places the return address B'+Δ onto the Return Stack Buffer 51 using the BAC TOS 53. At this point, the Return Stack Buffer 51 and the associated BAC TOS 53 and BTB TOS 55 pointers appear as illustrated in FIG. 7.

Upon returning to Subroutine B, the microprocessor encounters another Return From Subroutine instruction. If the Branch Target Buffer Circuit 40 predicts the Return From Subroutine instruction, the Branch Target Buffer Circuit 40 checks the valid bit 46. Since the valid bit is not set, the Branch Target Buffer Circuit 40 predicts a return to the return address in the Return Stack Buffer 51 pointed to by the BTB TOS 55. Thus, referring to FIG. 7, the Branch Target Buffer Circuit 40 correctly predicts the return address A+Δ. As illustrated by the example of FIG. 7, the BTB TOS 55 provides a source of return addresses for the Branch Target Buffer Circuit 40 when the Return Register 45 is invalid.

Stage 2—Decoding Return From Subroutine Instructions

Referring back to FIG. 3, after the Instruction Fetch Unit 30 fetches an instruction, the Instruction Fetch Unit 30 passes the instruction to the Instruction Decoder 60. If the Branch Target Buffer Circuit 40 predicts that a particular instruction is a branch instruction, the Instruction Fetch Unit 30 marks the instruction as a predicted branch instruction. The Instruction Fetch Unit 30 then passes the marked instruction and the Branch Target Buffer Circuit's branch prediction to the Instruction Decoder 60.

The Instruction Decoder 60 decodes each microprocessor instruction received to determine the microprocessor instruction type. The Instruction Decoder 60 breaks down each microprocessor instruction into one or more micro-operations (hereinafter referred to as micro-ops) with associated micro-operands. The one or more micro-ops corresponding to a microprocessor instruction will perform the function of the corresponding microprocessor instruction when later executed by an execution unit.

When the Instruction Decoder 60 receives a microprocessor instruction that is marked as a predicted branch instruction, the Instruction Decoder 60 verifies that the received instruction actually is a branch instruction. If the Instruction Decoder 60 determines that the branch instruction predicted by the Branch Target Buffer Circuit 40 is not actually a branch instruction, then the Instruction Decoder 60 instructs the Branch Target Buffer Circuit 40 to deallocate the Branch Target Buffer 41 entry that made the misprediction. If the mispredicted branch instruction was predicted taken, then the Instruction Decoder 60 flushes the front-end of the microprocessor and restarts the front-end of the microprocessor at a corrected address.

If the Instruction Decoder 60 determines that the received microprocessor instruction is a branch instruction, then the Instruction Decoder 60 passes information describing the branch instruction to a Branch Address Calculator 50 for special treatment. Specifically, the Instruction Decoder 60 passes a code describing the type of branch instruction received, the branch instruction's displacement, and the Branch Target Buffer Circuit's prediction to the Branch Address Calculator 50. Each type of branch instruction is handled differently by the Branch Address Calculator 50.

The code describing the type of branch instruction includes two bits that inform the Branch Address Calculator 50 if the branch instruction happens to be a Call Subroutine instruction or a Return From Subroutine instruction. As previously explained, when the Branch Address Calculator 50 receives a decoded Call Subroutine instruction, the Branch Address Calculator 50 increments the BAC TOS 53 and places the address of the instruction after the Call Subroutine instruction onto the Return Stack Buffer 51 using the BAC TOS 53. Correspondingly, when the Branch Address Calculator 50 later receives a decoded Return From Subroutine instruction, the Branch Address Calculator 50 retrieves a return address from the Return Stack Buffer 51 using the BAC TOS 53.

When the Branch Address Calculator 50 receives a Return From Subroutine instruction that was predicted by the Branch Target Buffer Circuit 40, the Branch Address Calculator 50 verifies the return address predicted by the Branch Target Buffer Circuit 40. The Branch Address Calculator 50 verifies the return address by comparing the return address predicted by the Branch Target Buffer Circuit 40 with the return address retrieved popped off the Return Stack Buffer 51 using the BAC TOS 53. The return address retrieved using the BAC TOS 53 is given preference over the return address retrieved using the BTB TOS 55 since the BAC TOS 53 is more accurate than the BTB TOS 55. If the two return addresses match, then the Branch Address Calculator 50 allows the instruction to continue down the pipeline. However, if the two return addresses do not match, then the Branch Address Calculator 50 flushes the front-end of the microprocessor and restarts the front-end using the return address retrieved from the Return Stack Buffer 51 using the BAC TOS 53.

When the Branch Address Calculator 50 receives a Return From Subroutine instruction that was not predicted by the Branch Target Buffer Circuit 40, the Branch Address Calculator 50 predicts a return address for the Return From Subroutine instruction. The Branch Address Calculator 50 predicts a return address by using the return address popped off the Return Stack Buffer 51 using the BAC TOS 53. Since the Branch Target Buffer Circuit 40 made no prediction, the Instruction Fetch Unit 30 has continued fetching instructions sequentially down the wrong path. Thus the Branch Address Calculator 50 must flush the front-end of the microprocessor and restarts the front-end using the return address retrieved from the Return Stack Buffer 51 using the BAC TOS 53.

When the Branch Target Buffer Circuit 40 fails to predict a branch instruction or mispredicts the target address of a branch instruction, the BTB TOS 55 controlled by the Branch Target Buffer Circuit 40 has probably fallen out of sync with the BAC TOS 53. For example, if the Branch Target Buffer Circuit 40 encounters a Call Subroutine instruction that is not stored in the Branch Target Buffer Cache 41, the Branch Target Buffer Circuit 40 will not increment the BTB TOS 55. Later, when the Call Subroutine reaches the Branch Address Calculator 50, the Branch Address Calculator 50 will increment the BAC TOS 53 and push the address onto the Return Stack Buffer 51. To correct this problem, the Branch Address Calculator 50 resynchronizes the pointers by setting the BTB TOS 55 pointer to equal the BAC TOS 53 when the Branch Target Buffer Circuit 40 fails to predict a branch instruction or mispredicts the target address of a branch instruction.

After the Branch Address Calculator 50 completes its operations, the Branch Address Calculator 50 returns the processed branch information to the Instruction Decoder 60. The Instruction Decoder 60 passes the branch micro-op to an Allocator 70. The Allocator 70 then allocates an entry in the Reorder Buffer 83 for the micro-op results and places the micro-op into a reservation station where the micro-op waits until it is dispatched to an execution unit.

Since the microprocessor of FIG. 3 can predict branch instructions and speculatively execute instructions, the microprocessor may accidentally execute instructions that should not have been fetched. If the microprocessor speculatively executes Call Subroutine or Return From Subroutine instructions, these instructions will alter the BAC TOS 53 pointer into the Return Stack Buffer 51. Thus, the BAC TOS 53 pointer can be corrupted by Call Subroutine or Return From Subroutine instructions located after mispredicted branch instructions.

To prepare a remedy for this situation, the microprocessor stores a copy of the BAC TOS 53 pointer whenever a branch instruction is passed to the Allocator 70. The Branch Address Calculator 50 sends a copy of the current BAC TOS 53 pointer to the Branch Target Buffer Circuit 40. The Branch Target Buffer Circuit 40 stores the BAC TOS pointer copy into a buffer called the Branch IP Table (BIT) 43.

Stage 3—Executing Return From Subroutine Instructions

Although the Return Stack Buffer 51 mechanism in the Branch Address Calculator 50 predicts return addresses very accurately, not every prediction is correct. For example, a series of Call Subroutine instructions longer than the number entries in the Return Stack Buffer 51 will cause the Return Stack Buffer 51 to overflow. Furthermore, a program may manually manipulate the microprocessor stack in such that the contents of the Return Stack Buffer 51 falls out of sync with the microprocessor stack. Thus, since the predicted return addresses may be wrong, a branch execution unit must verify every return address predicted by the Branch Address Calculator 50.

Each micro-op waits at a reservation station entry until the required data is available. When all the data required to execute a Return From Subroutine micro-op is available, the reservation station dispatches the Return From Subroutine micro-op to the Branch Execution Unit 92. The Branch Execution Unit 92 executes each Return From Subroutine micro-op by determining a final return address popped off the microprocessor stack. The Branch Execution Unit 92 compares the final return address with the predicted return address to determine if the Return From Subroutine instruction was predicted correctly or mispredicted.

If the Return From Subroutine instruction was predicted correctly by the Branch Target Buffer Circuit 40 or the Branch Address Calculator 50, then the microprocessor simply continues execution along the current path.

However, if the Return From Subroutine instruction was mispredicted, then the Branch Execution Unit 92 must handle the mispredicted instruction. The Branch Execution Unit 92 first determines if the mispredicted Return From Subroutine instruction is the oldest nonretired mispredicted branch stored in the Reorder Buffer 83. If an older mispredicted branch exists, the Branch Execution Unit 92 ignores the mispredicted Return From Subroutine instruction since the Branch Execution Unit 92 already flushed the microprocessor when the earlier mispredicted branch was executed. The handling of mispredicted branches by the Branch Execution Unit 92 is explained in greater detail in the copending patent application "Method and Apparatus for Implementing A Four Stage Branch Resolution System In A Computer Processor", Ser. No. 08/176,785 filed Jan. 3, 1994.

If the mispredicted Return From Subroutine instruction is the oldest nonretired mispredicted branch, the Branch Execution Unit 92 flushes the entire front end of the microprocessor. The Branch Execution Unit 92 restarts the front-end of the microprocessor using the return address retrieved from the microprocessor stack. Finally, the Branch Execution Unit 92 stalls the Allocator 70 to prevent any new micro-ops from entering the out-of-order section of the microprocessor. New micro-ops must not be allowed into the out-of-order section of the microprocessor since the instructions fetch after the mispredicted branch must later be flushed from the out-of-order section of the microprocessor.

As stated in the preceding section, the instructions executed after the mispredicted branch cause the microprocessor to lose valuable state information. For example, a Call Subroutine instruction after a mispredicted branch causes the Branch Target Buffer Circuit 40 to store an address into the Return Register 45 and increment the BTB TOS 55. Later, the Branch Address Calculator 50 will increment the BAC TOS 53 pointer. These changes will seriously reduce the branch prediction accuracy of the front-end of the microprocessor.

To remedy this situation, the following actions take place after any branch misprediction is detected by the Branch Execution Unit 92:

1) Clear the valid bit 46 associated with the Return Register 45.
2) Restore BAC TOS 53 pointer value that was stored in the Branch IP table 43.
3) Synchronize BTB TOS 55 pointer to the BAC TOS 53 pointer.

The valid bit 46 associated with the Return Register 45 is cleared since a Call Subroutine instruction may have been encountered after the branch misprediction thus destroying the data in the Return Register 45. The BAC TOS 53 pointer is restored by accessing the copy of the BAC TOS 53 pointer that stored before the Allocator 70 issued the branch micro-op to the reservation station. Thus the BAC TOS 53 pointer points to the same position in the Return Stack Buffer 51 that the BAC TOS 53 pointer pointed to before misprediction occurred. Finally, the BTB TOS 55 pointer is resynchronized with the BAC TOS 53 pointer.

Stage 4—Retiring Return From Subroutine Instructions

The final stage in resolving a Return From Subroutine instruction is performed by the Retirement Circuit 85. The Retirement Circuit 85 is responsible for retiring the micro-ops executed by the processor. The Retirement Circuit 85 prevents instructions fetched after mispredicted branches from being committed into permanent state.

As stated in the previous section, when the Branch Execution Unit 92 detects a mispredicted branch that is the oldest nonretired mispredicted branch, the Branch Execution Unit 92 flushes the entire front-end of the microprocessor. However, there may be number of instructions that were fetched after the branch misprediction that are still in microprocessor. Other instructions that were fetched after the branch misprediction may still reside in other execution units or in the reservation station and reorder buffer. To prevent these instructions that should not have been fetched from being committed into permanent architectural state, the Retirement Circuit 85 flushes these instructions when the mispredicted branch retires.

To flush the instructions fetched after a mispredicted branch that remain in the microprocessor, the Retirement Circuit 85 clears all the entries in the reorder buffer that follow the mispredicted branch when the mispredicted branch retires. After clearing all the reorder buffer entries after the mispredicted branch, the Retirement Circuit 85 restarts the Allocator 70 that was stalled when the Branch Execution Unit 92 detected the mispredicted branch. By restarting the Allocator 70, the Branch Execution Unit 92 allows the new instructions that were fetched by the Instruction Fetch Unit 30 to enter Out-of-order section of the microprocessor.

The foregoing has described several methods and apparatus for resolving Return From Subroutine instructions in a computer processor. It is contemplated that changes and modifications may be made by one of ordinary skill in the art, to the materials and arrangements of elements of the present invention without departing from the scope of the invention.

We claim:

1. An apparatus for predicting return addresses for Return From Subroutine instructions, said apparatus comprising a branch target buffer, said branch target buffer comprising a plurality of branch entries for storing information about a plurality of branch instructions;

a branch target buffer circuit, said branch target buffer circuit predicting said plurality of branch instructions in a stream of computer instructions using said information stored in said branch target buffer;

a return register, said branch target buffer circuit storing a return address into said return register after a Call Subroutine branch instruction is predicted by said branch target buffer circuit, said branch target buffer circuit predicting a branch to said return address in said return register when a Return From Subroutine branch instruction is predicted by said branch target buffer circuit; and a return register valid bit, said return register valid bit determining how said branch target buffer circuit predicts said return address for said Return From Subroutine instruction.

2. The apparatus for predicting return addresses for Return From Subroutine instructions as claimed in claim 1 wherein said return register valid bit is set after a Call Subroutine branch instruction is predicted by said branch target buffer circuit, said branch target buffer circuit predicting a branch to said return address in said return register only when said return register valid bit is set, said branch target buffer circuit clearing said return register valid bit after said return address in said return register is predicted when a Return From Subroutine branch instruction is predicted.

3. The apparatus for predicting return addresses for Return From Subroutine instructions as claimed in claim 2 further comprising a return stack buffer, said return stack buffer storing a stack of return addresses, said branch target buffer circuit predicting a branch to a return address on top of said return stack buffer when a Return From Subroutine branch instruction is predicted and said return register valid bit is clear.

4. The apparatus for predicting return addresses for Return From Subroutine instructions as claimed in claim 3 further comprising a first return stack buffer pointer, said first return stack buffer pointer incremented and a return address pushed onto said return stack buffer when a Call Subroutine branch instruction is decoded, a return address popped off said return stack buffer and said first return stack buffer pointer decremented when a Return From Subroutine branch instruction is decoded.

5. The apparatus for predicting return addresses for Return From Subroutine instructions as claimed in claim 4 further comprising a second return stack buffer pointer, said second return stack buffer pointer incremented when a Call Subroutine branch instruction is predicted by said branch target buffer circuit, said second return stack buffer pointer used to predict a return address from said return stack buffer when a Return From Subroutine branch instruction is predicted and said return register valid bit is clear, said second return stack buffer pointer decremented when a Return From Subroutine branch instruction is predicted by said branch target buffer circuit.

6. The apparatus for predicting return addresses for Return From Subroutine instructions as claimed in claim 5 wherein said return address popped off said return stack buffer is used to verify the return address predicted by said branch target buffer circuit.

7. The apparatus for predicting return addresses for Return From Subroutine instructions as claimed in claim 5 wherein said return address popped off said return stack buffer is used to predict a return address when said branch target buffer circuit did not predict said Return From Subroutine branch instruction.

8. The apparatus for predicting return addresses for Return From Subroutine instructions as claimed in claim 5 further comprising a branch information buffer, said branch information buffer storing said a copy of said first return stack buffer pointer when a branch instruction is decoded.

9. The apparatus for predicting return addresses for Return From Subroutine instructions as claimed in claim 8 wherein said first return stack buffer pointer is restored using said copy of said first return stack buffer pointer stored in said branch information buffer when a branch misprediction is detected.

10. The apparatus for predicting return addresses for Return From Subroutine instructions as claimed in claim 9 wherein said second return stack buffer pointer set equal to said first return stack buffer pointer when a branch misprediction is detected.

11. A method for handling Return From Subroutine instructions in a computer processor, said method comprising predicting branch instructions using a branch target buffer circuit;

storing a return address in a return register when said branch target buffer circuit predicts a Call Subroutine instruction;

determining a return register valid bit status; and predicting said return address in said return register when said branch target buffer circuit predicts a Return From Subroutine instruction based on said return register valid bit status.

12. The method for handling Return From Subroutine instructions in a computer processor as claimed in claim 11 wherein said method further comprises the steps of decoding said branch instructions;

pushing a return address on a return stack buffer using a first return stack buffer pointer when a Call Subroutine instruction is decoded;

popping a return address off said return stack buffer using said first return stack buffer pointer when a Return From Subroutine instruction is decoded; and predicting said return address popped off said return stack buffer when said branch target buffer circuit fails to predict a Return From Subroutine instruction.

13. The method for handling Return From Subroutine instructions in a computer processor as claimed in claim 12 wherein said method further comprises the steps of verifying said return address predicted by said branch target buffer circuit when said branch target buffer circuit predicts a Return From Subroutine instruction.

14. The method for handling Return From Subroutine instructions in a computer processor as claimed in claim 12 wherein said step of storing a return address in a return register further comprises setting a return register valid bit, said step of predicting said return address in said return register when said branch target buffer circuit predicts a Return From Subroutine instruction only occurs if said return register valid bit is set, and said step of predicting said return address in said return register further comprises clearing said return register valid bit.

15. The method for handling Return From Subroutine instructions in a computer processor as claimed in claim 14 further comprising the steps of incrementing a second return stack buffer pointer when a Call Subroutine instruction is decoded;

decrementing said second return stack buffer pointer when a Return From Subroutine instruction is decoded; and predicting a return address from said return stack buffer using said second return stack buffer pointer when said branch target buffer circuit predicts a Return From Subroutine instruction and return register valid bit is clear.

16. The method for handling Return From Subroutine instructions in a computer processor as claimed in claim 15 wherein said step of decoding said branch instructions further comprises storing a copy of said first return stack buffer pointer in a branch information buffer.

17. The method for handling Return From Subroutine instructions in a computer processor as claimed in claim 16 further comprising the step of restoring said first return stack buffer pointer using said copy of said first return stack buffer pointer stored in said branch information buffer when a branch misprediction is detected.

18. The method for handling Return From Subroutine instructions in a computer processor as claimed in claim 17 further comprising the step of setting said second return stack buffer pointer equal to said first return stack buffer pointer when a branch misprediction is detected.

19. A branch instruction prediction mechanism in a computer processor, said branch instruction prediction mechanism predicting branch instructions within a stream of computer instructions, said branch instructions comprising Call Subroutine instructions and Return From Subroutine instructions, said branch instruction prediction mechanism comprising a branch target buffer, said branch target buffer comprising a plurality of entries for storing information about said branch instructions;

a branch execution unit, said branch execution unit executing a plurality of branch instruction in said stream of computer instructions, said branch execution unit storing information about said executed branch instructions in said branch target buffer;

a branch target buffer circuit, said branch target buffer circuit predicting said executed branch instructions in said stream of computer instructions when said executed branch instructions are encountered again;

a return register, said branch target buffer circuit storing a return address into said return register after each said Call Subroutine instruction predicted by said branch target buffer circuit;

a return register valid bit, said return register valid bit associated with said return register determining source of said return address predicted by said branch target buffer circuit; and a return address prediction mechanism, said return address prediction mechanism predicting a branch to said return address stored in said return register when said each said Return From Subroutine instruction is predicted by said branch target buffer circuit based on a return register valid bit.

20. The branch instruction prediction mechanism as claimed in claim 19 wherein said return register valid bit is set after a Call Subroutine branch instruction is predicted by said branch target buffer circuit, said branch target buffer circuit predicting a branch to said return address in said return register only when said return register valid bit is set, said branch target buffer circuit clearing said return register valid bit after said return address in said return register is predicted when a Return From Subroutine branch instruction is predicted.

21. The branch instruction prediction mechanism as claimed in claim 20 further comprising a return stack buffer, said return stack buffer storing a stack of return addresses, said branch target buffer circuit predicting a branch to a return address on top of said return stack buffer when a Return From Subroutine branch instruction is predicted and said return register valid bit is clear.

22. The branch instruction prediction mechanism as claimed in claim 21 further comprising a first return stack buffer pointer, said first return stack buffer pointer incremented and a return address pushed onto said return stack buffer when a Call Subroutine branch instruction is decoded, a return address popped off said return stack buffer and said first return stack buffer pointer decremented when a Return From Subroutine branch instruction is decoded.

23. The branch instruction prediction mechanism as claimed in claim 22 further comprising a second return stack buffer pointer, said second return stack buffer pointer incremented when a Call Subroutine branch instruction is predicted by said branch target buffer circuit, said second return stack buffer pointer used to predict a return address from said return stack buffer when a Return From Subroutine branch instruction is predicted and said return register valid bit is clear, said second return stack buffer pointer decremented when a Return From Subroutine branch instruction is predicted by said branch target buffer circuit.

24. The branch instruction prediction mechanism as claimed in claim 23 wherein said return address popped off said return stack buffer is used to verify the return address predicted by said branch target buffer circuit.

25. The branch instruction prediction mechanism as claimed in claim 23 wherein said return address popped off said return stack buffer is used to predict a return address when said branch target buffer circuit did not predict said Return From Subroutine branch instruction.

26. The branch instruction prediction mechanism as claimed in claim 23 further comprising a branch information buffer, said branch information buffer storing said a copy of said first return stack buffer pointer when a branch instruction is decoded.

27. The branch instruction prediction mechanism as claimed in claim 26 wherein said first return stack buffer pointer is restored using said copy of said first return stack buffer pointer stored in said branch information buffer when a branch misprediction is detected.

28. The branch instruction prediction mechanism as claimed in claim 27 wherein said second return stack buffer pointer set equal to said first return stack buffer pointer when a branch misprediction is detected.

* * * * *

UNITED STATES PATENT AND TRADEMARK OFFICE
CERTIFICATE OF CORRECTION

PATENT NO.  : 5,604,877
DATED       : February 18, 1997
INVENTOR(S) : Hoyt et al.

It is certified that error appears in the above-identified patent and that said Letters Patent is hereby corrected as shown below:

In column 6 at line 12 delete "151 using the BAG" and insert --51 using the BAC--

In column 6 at line 13 delete "150" and insert --50--

In column 6 at line 16 delete "150" and insert --50--

Signed and Sealed this

First Day of July, 1997

Attest:

BRUCE LEHMAN

*Attesting Officer*    *Commissioner of Patents and Trademarks*